(12) United States Patent
Leibetseder

(10) Patent No.: US 11,871,729 B2
(45) Date of Patent: Jan. 16, 2024

(54) FEED DISPENSER

(71) Applicant: Ferdinand Leibetseder, St. Valentin (DE)

(72) Inventor: Ferdinand Leibetseder, St. Valentin (DE)

( * ) Notice: Subject to any disclaimer, the term of this patent is extended or adjusted under 35 U.S.C. 154(b) by 225 days.

(21) Appl. No.: 17/432,348

(22) PCT Filed: Mar. 3, 2020

(86) PCT No.: PCT/AT2020/060060
§ 371 (c)(1),
(2) Date: Aug. 19, 2021

(87) PCT Pub. No.: WO2020/181309
PCT Pub. Date: Sep. 17, 2020

(65) Prior Publication Data
US 2023/0180710 A1 Jun. 15, 2023

(30) Foreign Application Priority Data
Mar. 8, 2019 (AT) ............... A 50184/2019

(51) Int. Cl.
*A01K 5/00* (2006.01)
(52) U.S. Cl.
CPC ................. *A01K 5/00* (2013.01)
(58) Field of Classification Search
CPC .......... A01K 5/00; A01K 5/002; A01K 5/005; A01K 5/007
See application file for complete search history.

(56) References Cited

U.S. PATENT DOCUMENTS

| 1,569,990 | A |   | 11/1924 | Lovering |   |
|---|---|---|---|---|---|
| 3,113,556 | A | * | 12/1963 | Jarvis | A01K 61/85 119/51.11 |
| 4,508,061 | A |   | 4/1985 | Swearingin |   |
| 4,665,862 | A | * | 5/1987 | Pitchford, Jr. | A01K 5/0275 119/51.11 |

(Continued)

FOREIGN PATENT DOCUMENTS

| CN | 108651308 A | 10/2018 |
|---|---|---|
| DE | 19917650 A | 12/2000 |

(Continued)

*Primary Examiner* — Ebony E Evans
(74) *Attorney, Agent, or Firm* — Andrew Wilford

(57) ABSTRACT

The invention relates to a feed dispenser for horses which comprises a main housing (1), having a loading opening (2) and a discharge opening (3), and an actuation element (7) for a horse, wherein an endless screw (4) rotatable in a drive direction about its longitudinal axis is provided in the main housing (1) and is drive-connected via a driver (5), which runs freely counter to the drive direction, to the actuation element, which is movable counter to the force of a return spring (6) between an idle position and an actuation position. In order to design a feed dispenser of the described kind so that chunky animal feed can be used, regardless of its shape or size, without having to be pre-processed in advance, it is proposed that the endless screw (4) has a peripheral screw blade (20) forming cutting faces (19) for comminuting chunky material, and/or that the main housing (1) has an auxiliary cutter.

5 Claims, 3 Drawing Sheets

(56) References Cited

U.S. PATENT DOCUMENTS

Figure 1:
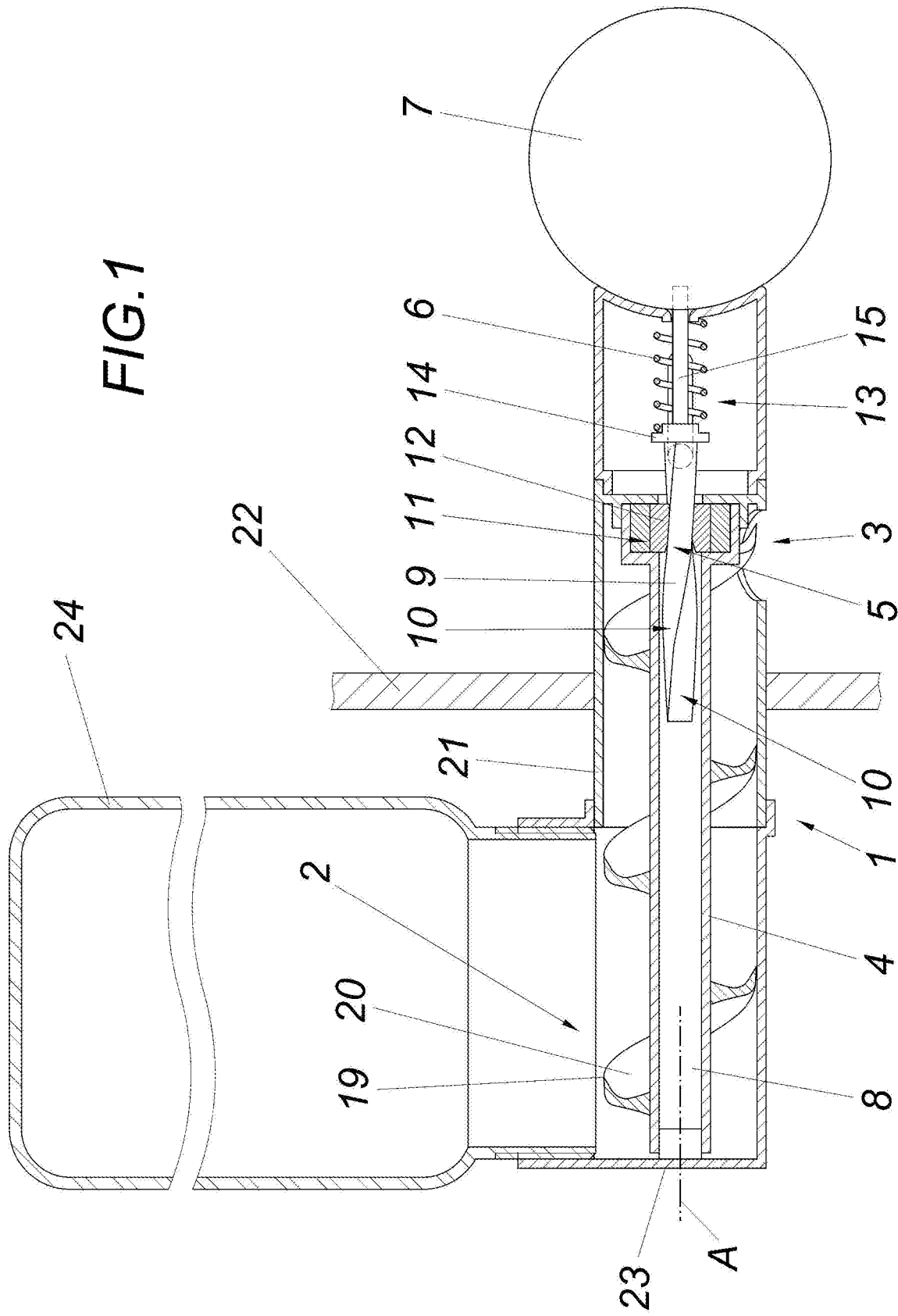

| | | | | |
|---|---|---|---|---|
| 4,850,515 A | * | 7/1989 | Cleland | B67D 1/0004 222/164 |
| 5,190,113 A | * | 3/1993 | Hawrylak | A01K 97/01 175/18 |
| 5,315,958 A | * | 5/1994 | Forster | A01K 11/006 119/54 |
| 6,161,503 A | * | 12/2000 | Blas | A01K 5/0291 119/51.5 |
| 2004/0035965 A1 | * | 2/2004 | Rousseau | B02C 18/067 241/101.761 |
| 2011/0132266 A1 | | 6/2011 | Hery | |
| 2021/0144961 A1 | | 5/2021 | Holzbaur | |

FOREIGN PATENT DOCUMENTS

| | | | |
|---|---|---|---|
| EP | 0395179 A | | 10/1990 |
| FR | 3050611 A | | 11/2017 |
| RU | 2311761 C2 | * | 12/2007 |

\* cited by examiner

FEED DISPENSER

CROSS REFERENCE TO RELATED APPLICATIONS

This application is the US-national stage of PCT application PCT/AT2020/060060 filed 3 Mar. 2020 and claiming the priority of Austrian patent application A50184/2019 itself filed 8 Mar. 2019.

TECHNICAL FIELD

The invention relates to a feed dispenser for a horse, comprising a housing having an intake port and an output port, and an element actuatable by the horse.

BACKGROUND OF THE INVENTION

A feed dispensers for horses is known from the prior art (AT 519872 US 2021/0144961) that has a tube extending vertically when in use as a housing with an upper intake port and a lower output port. The tube is traversed by at least two cables extending in the longitudinal direction of the tube and elastic elements extending transversely with respect to the longitudinal direction of the tube. As a result of the cables in their initial position, the passage cross-section of the tube is reduced, so that large piece goods, for example apples, are prevented from slipping or falling toward of the output port by the cables. In order to release the piece good by moving the cables from the initial position retaining the piece goods into a release position, the cables are each connected to a biasing element running normal to the longitudinal direction thereof and passing through the tube jacket, and a spherical actuating element is fastened to the end of the biasing element outside the tube, which actuating element can be actuated by the horse by biting and simultaneous pulling. In an alternative embodiment, the feed dispenser can have a flexible hose instead of the cables, so that the use of free-flowing instead of lumpy horse feed is thereby made possible. However, it is disadvantageous that conversion work is required in order to be able to change between lumpy and pourable horse fodder. In addition, in the case of feed dispensers of this type, a controlled delivery of feed is not possible, since, on account of the cables and elastic biasing element used, there is the risk that, when the feed dispenser is actuated, either an amount of animal feed that is too large or even no animal feed is released. Even in the case of large piece goods such as apples, eating large amounts of feed in a short period of time is harmful to the horse's health.

Devices are also known from the prior art (U.S. Pat. No. 4,508,061, EP 0398179) that comprise an auger that can be rotated about its longitudinal axis in a drive direction, and that is connected to a coupling to an actuating element that can be displaced between a rest position and an operating position opposite the force of a return spring.

Devices for dispensing mineral feed by a distributing wheel are known from FR 3050610. Furthermore, U.S. Pat. No. 1,699,990 shows feeding containers that have a rotatable drum for dispensing the feed.

In order to permit precise metering of pourable feed, a counterweight is proposed in DE 19917650 as an actuating element for a movably mounted storage container or metering device.

US 2011/0132266 discloses a feed dispenser that has a vertically extending housing with a feed reservoir, and the feed reservoir tapers toward its output port like a funnel. In addition, a vertically extending auger is arranged in the feed reservoir.

OBJECT OF THE INVENTION

The invention is therefore based on the object of designing a feed dispenser of the above-described type in such a way that, with a compact design without conversion work enables controlled feed delivery of both lumpy and pourable feed.

SUMMARY OF THE INVENTION

The invention attains the above object in that there is provided in the housing an auger rotatable about its longitudinal axis in a drive direction and that is connected via a coupling that freewheels opposite the drive direction to the coupling that is movable opposite the force of a return spring between a rest position and an actuated position and can be moved in a drive-connected manner. As a result of these features, horse food can be delivered both as piece goods such as, for example, apples, or as pourable goods, such as for example particulate feed, via the intake port of the auger and conveyed further from the latter to the output port, and a robust and low-wear construction of the feed dispenser is made possible. As a result of the fact that the coupling freewheels opposite the drive direction, rotation of the auger oppositely as a result of the return movement of the actuating element from the operating position into the rest position can be prevented as well as a return or back-up of animal feed already conveyed toward the output port. Depending on the dimensioning of the auger as well as its mounting in the housing, it is possible to adjust whether the auger, as a result of displacement of the actuating element from the rest position into the actuation position, moves only through a predetermined angle, so that the feed discharge takes place discontinuously, or else whether the feed auger that is angularly stepped can continue to rotate as a result of inertia in order to enable continuous feed discharge. The feed dispensers according to the invention thus ensure that the horse takes smaller feed rations from lumpy animal feed, such as apples, over a longer period of time without refilling the feed dispenser, as a result of which a overfeeding of the horse is avoided.

In order to challenge the horse that actuates the feed dispenser according to the invention, with regard to its cognitive and fine-motor capabilities, different, parallel or exchangeable actuating mechanisms may be provided that will be described below.

Particularly favorable structural conditions and an operability that is simple for the horse are obtained if the coupling is a screw-thread drive that converts straight-line movement along the auger's longitudinal axis into rotation of the auger about this longitudinal axis and where a biasing element supported against a return spring is tensioned or compressed along the longitudinal axis. In this case, the coupling according to the invention can comprise a drive rod that fits into a core of the auger and has guide surfaces that extend around the longitudinal axis in helix and complementary stop surfaces of a freewheel that are supported against the auger. The drive rod can be designed, for example, as a twisted square- or star-section rod or as a threaded rod that forms guide surfaces and has threads that extend helically. In order to also permit a uniform straight-line movement of the biasing element along the longitudinal axis of the worm, the biasing element can have guide bodies engaging in guide grooves. In order that the actuating means can be moved by the horse by pressing and/or pulling, the traction element can have a pull head braced against the return spring and a tension-resistant and flexible connecting body, such as, for example, a cable that is connected to the pull head. The desired discharge quantity of the animal feed can be preset according to the pitch of the auger or else the gear transmission ratio between the coupling and the auger or the displacement path length.

In addition, the tie rod can be drive-connected to the actuating element by a lever that pivots rotatable about a lever axis running transversely to the longitudinal axis of the auger, so that the feed dispenser is actuated when the horse moves it snout toward the dispenser. The lever can, for example, comprise a protective casing rotatably mounted in the housing or be in a protective casing attached to the housing for the lever, and form connecting forks that engage with transversely with the longitudinal axis of the pull rod and project therefrom.

The coupling according to the invention can also have a rod extending transversely from the longitudinal axis of the auger and movable about this longitudinal axis against the force of a return spring, this transverse rod carrying an actuating element offset from the axis. As a result, the drive of the auger does not take place via a conversion of straight-line movement directed longitudinally and axially of the auger into rotation about the longitudinal axis of the auger, but rather torque can be introduced directly into the coupling via the actuating element offset from the longitudinal axis of the auger on the transverse rod and consequently into the auger, it also being possible for a plurality of such actuating elements on respective transverse rods to be provided.

Precisely in the case of larger piece goods such as carrots or apples, the piece goods must be preprocessed accordingly with regard to piece goods sizes that are compatible with the horse before the feed dispenser is supplied therewith. In order, therefore, to ensure that one-piece animal feed can be used independently of its shape or size without having to preprocess it first, it is recommended that the auger has a revolving cutting surfaces for comminuting piece goods, the auger blade forming piece goods. As a result, for example, both apples and elongated piece goods, such as carrots, can be comminuted into a piece size that is more compatible with the horse and can be conveyed further by the auger without problems. For example, the auger can comminute the feed between the auger blade and the edge of the housing port. For even better cutting conditions, the housing can have an auxiliary cutting edge in this area.

In the case of the feed dispensers known from the state of the art and having a vertically extending tube as housing, the refilling process is problematic in that the filling of animal feed has to take place at the intake port from above the uppermost tube end requiring the use of, for example, a ladder. If is desired in contrast to this to make the tubular housing shorter, the result is a smaller filling volume and thus shorter replenishment intervals. In addition, this results in connection with feed dispensers whose feed openings are at the top and overhead, as such containers are difficult to refill or require the use of an additional funnel.

In this regard, in order to increase fill volume and a rapid and simple refilling operation of the animal feed dispenser it is proposed that the housing has a loading section rotatable relative to the discharge section about the longitudinal axis of the auger between a use position and a refilling position and on whose intake port a storage container for the animal feed is releasably attached. The feed section can, for example, be rotated by 180° about the longitudinal axis of the auger relative to the discharge section of the housing and be attached by a bayonet joint. Accordingly, in the position of use, the storage container is above the auger housing and connected thereto by a screw thread joint. For refilling, the loading section and storage container are first rotated down in to the refill position and separated from the auger housing. When separated, the storage container can be refilled, the refilled container is then screwed back onto the housing, so that the holding capacity of the system is no longer limited by the height of the animal feed dispenser.

BRIEF DESCRIPTION OF THE INVENTION

Figure 2:
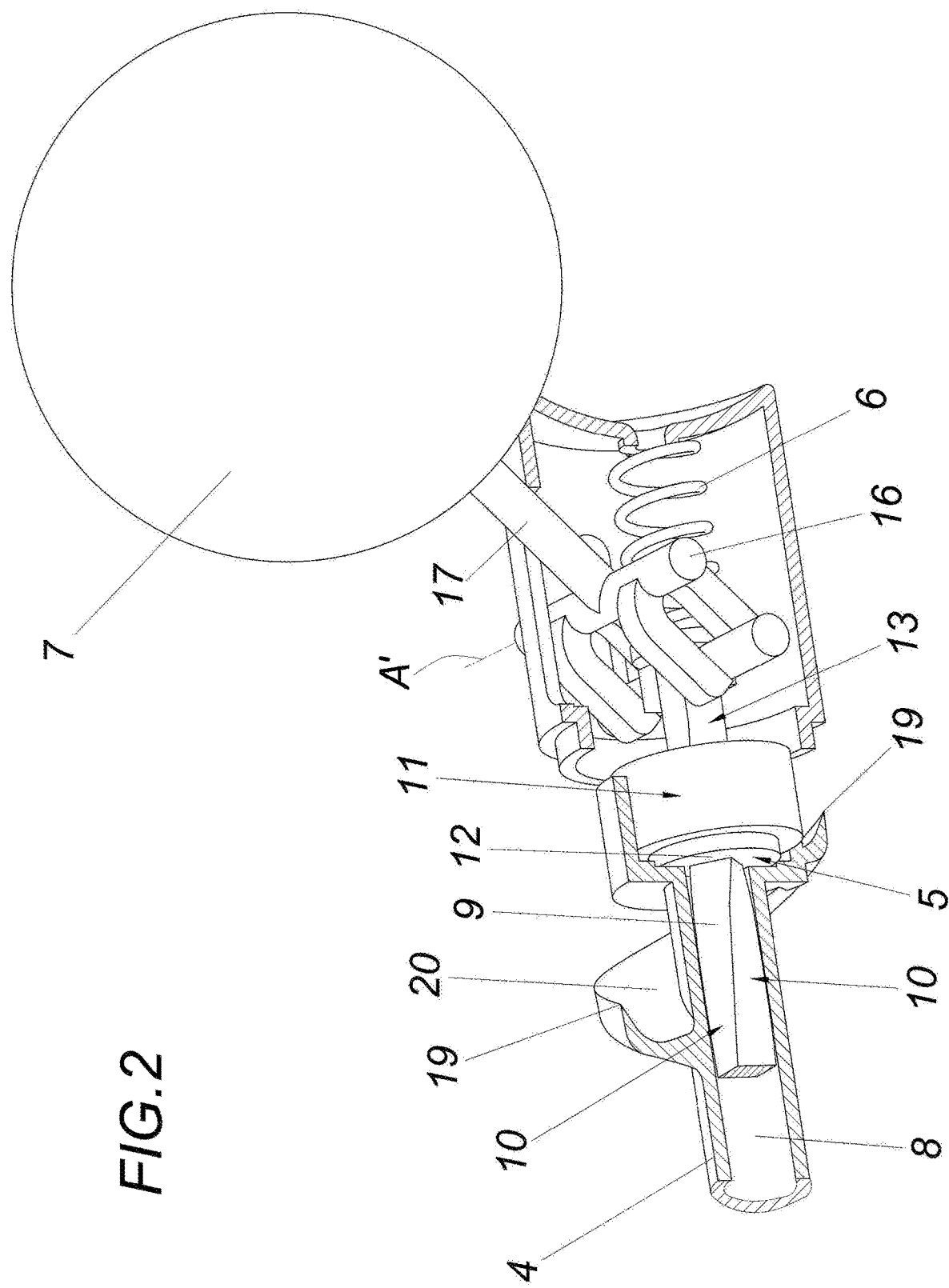
Figure 3:
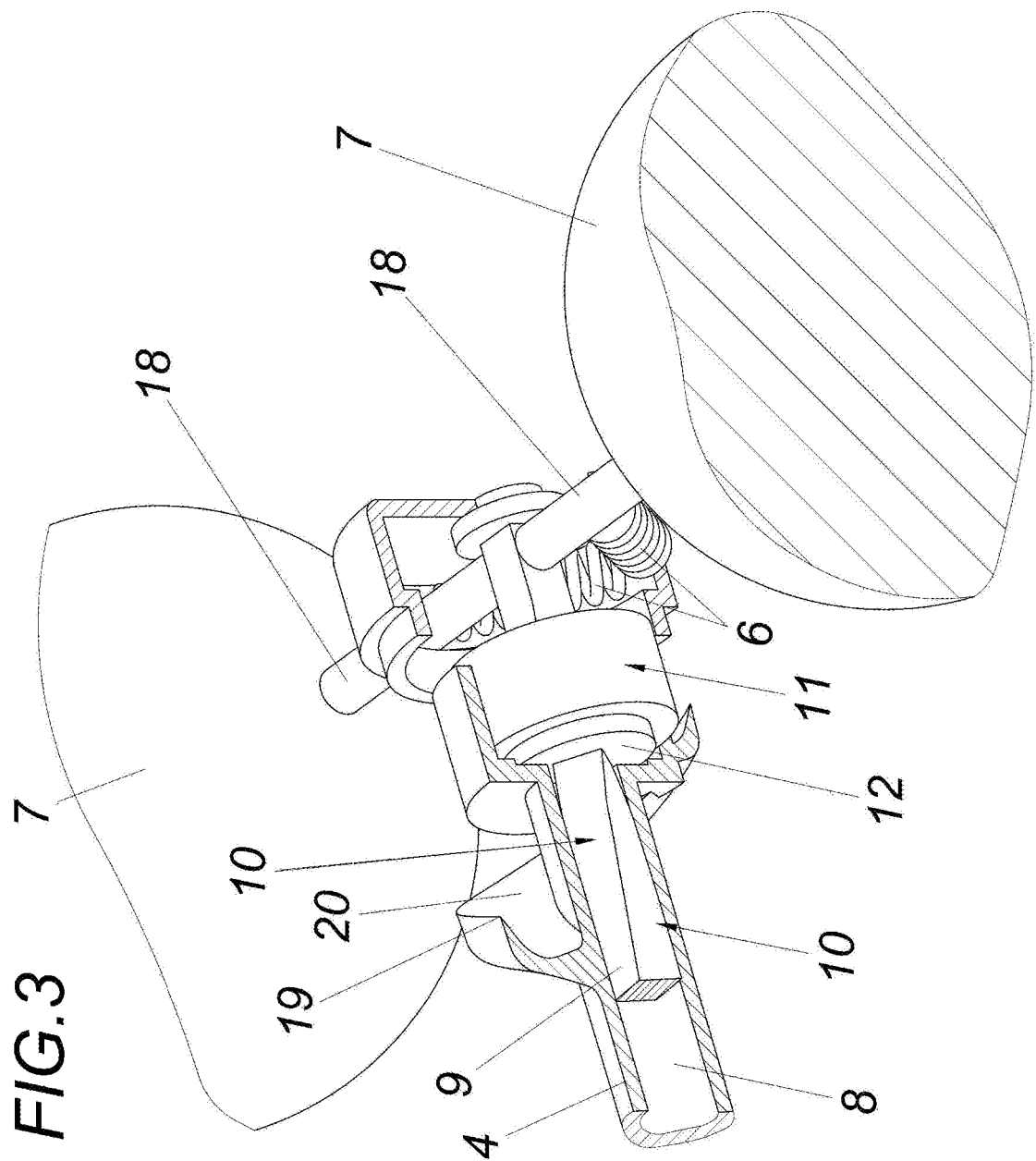

In the drawing, the subject matter of the invention is illustrated by way of example. Therein:

FIG. 1 is a schematic side sectional view of a first embodiment of a feed dispenser in accordance with the present invention, FIG. 2 is a large-scale detail view of a second embodiment of an actuating element and coupling according to the invention, and FIG. 3 is a view like FIG. 2 of actuating elements according to the invention and of a coupling of a third embodiment.

WAYS OF CARRYING OUT THE INVENTION

A feed dispenser according to the invention has a housing 1 with an intake port 2 and an output port 3. The housing 1 holds an auger 4 rotatable about its longitudinal axis in a drive direction and connected via a one-way coupling 5 that freewheels opposite the drive direction to an actuating element 7 movable opposite the force of a return spring 6 between a rest position and an actuated position. FIGS. 1 to 3 show the actuating element 7 in its rest position.

Here the coupling 5 can be rotated, for example pivotally, and has a drive rod 9 that fits in an auger tube shaft 8 and has guide spiral guide surfaces 10 extending around the longitudinal axis and engaging stops of a freewheel 11 carried on the auger 4 and fitting with these guide surfaces. The stops are formed, for example, by a rotary part 12 of the freewheel 11 fitted around the drive rod 9. The coupling 5 forms a screw-thread drive in order to convert straight-line axial movement into rotation of the auger 4 about the longitudinal axis of the auger 4, and a traction element 13 acts on the screw-thread drive in order to initiate the straight-line axial and longitudinal movement, the traction element 13 acting oppositely to the return spring 6, and including, for example, a cable 15. The spring 6 surrounds the cable 15 of the traction element 13 and is braced between a washer 14 fixed on the rod 9 and the housing 1.

In the embodiment illustrated in FIG. 2, the traction element 13 is a pull rod that is connected to the actuating element 7 by a lever 17 pivotal about an axis extending transversely to the longitudinal axis of the auger 4 and for example formed by a pivot pin 16.

FIG. 3 shows a further embodiment where the coupling 5 is rotationally fixed to rotatable transverse rods 18 extending transversely oppositely relative to the axis from the auger 4, rotationally oppositely biased by respective return springs 6, and carrying respective elements 7 offset from the longitudinal axis of the auger 4.

In order to comminute conveyed piece goods, the auger 4 has a blade 20 forming a helical cutting edge 19.

The housing 1 of a feed dispenser according to the invention can for example have a discharge section 21 carried on a mount rod 22 or grate of the housing 1. For easy refill, the housing 1 can also have a load section 23 rotatable relative to the discharge section 23 about the axis between a use position shown in FIG. 1 and a refilling position (not shown in greater detail). A container 24 for the animal feed is releasably attached to the intake port 2 of the loading section 23.

The invention claimed is:

1. A horse-feed dispenser comprising
a housing having an intake port and an output port,
an actuating element for a horse,
a return spring braced between the housing and the actuating element,
an auger extending along and rotatable in the housing about a longitudinal axis and drivingly connected to the actuating element that is displaceable opposite the force of the return spring between a rest position and an actuated position via a coupling that freewheels in a drive direction,
a rotating blade on the auger and having a blade edge, and
an auxiliary edge on the housing, the edges serving for comminuting feed, the coupling being a screw-thread drive that converts longitudinally axial movement into rotation of the auger about the longitudinal axis and on which a biasing element braced against the return spring bears longitudinally axially.

2. The feed dispenser according to claim 1, wherein the biasing element has a lever rotatable about a lever axis running transversely to the longitudinal axis of the auger and driven by the actuating element.

3. The feed dispenser according to claim 1, wherein the coupling is rotationally fixed to a guide rail extending transversely with respect to the longitudinal axis of the auger and is rotatable about the longitudinal axis against the force of the return spring, a transverse rod carrying the actuating element being offset from the longitudinal axis of the auger.

4. A horse-feed dispenser comprising
a housing having an intake port and an output port,
an actuating element for a horse,
a return spring braced between the housing and the actuating element,
an auger extending along and rotatable in the housing about a longitudinal axis and drivingly connected to the actuating element that is displaceable opposite the force of the return spring between a rest position and an actuated position via a coupling that freewheels in a drive direction,
a rotating blade on the auger and having a blade edge,
an auxiliary edge on the housing, the edges serving for comminuting feed, the housing having a discharge section and a loading section rotatable about the longitudinal axis of the auger relative to the discharge section between a use position and a loading position, and
a storage container for the feed being releasably attached to the loading section.

5. A feed dispenser comprising:
an elongated tubular housing extending along an axis and having an intake end formed with a radially open intake port having an auxiliary edge and an output end having a radially open output port;
an auger rotatable in a direction in the housing about the axis and extending between the intake and outlet ports and having a helical blade with a blade edge;
an actuating element shiftable transversely of the axis outside the housing between a rest position and an actuated position;
a spring urging the element into one of the positions; and
a rotary freewheel coupling connecting the element to the auger so as to load the spring on movement of the actuating element from the one position and the other position and to rotate the auger in the direction on movement of the actuating member by the spring from the other position into the one position.

\* \* \* \* \*